(12) United States Patent
Evers

(10) Patent No.: US 7,240,472 B2
(45) Date of Patent: Jul. 10, 2007

(54) COLLECTION CONTAINER FOR A VEHICLE

(75) Inventor: Bart Evers, Haaksbergen (NL)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/123,621

(22) Filed: May 6, 2005

(65) Prior Publication Data

US 2005/0281645 A1 Dec. 22, 2005

(30) Foreign Application Priority Data

May 14, 2004 (DE) .................. 10 2004 023 994

(51) Int. Cl.
*A01D 43/06* (2006.01)
(52) U.S. Cl. ...................................... 56/202
(58) Field of Classification Search ............ 15/202, 15/203, 205, 320.1, 320.2, 83; 56/202, 203, 56/205
See application file for complete search history.

(56) References Cited

U.S. PATENT DOCUMENTS

| | | | |
|---|---|---|---|
| 4,487,007 A * | 12/1984 | Mullet et al. ................ 56/16.6 |
| 4,782,650 A * | 11/1988 | Walker ........................ 56/16.6 |
| 4,984,420 A * | 1/1991 | Samejima et al. ............ 56/203 |
| 5,107,661 A | 4/1992 | Shimamura .................. 56/12.8 |
| 5,199,521 A * | 4/1993 | Samejima et al. ......... 180/68.1 |
| 5,870,889 A | 2/1999 | Togoshi et al. ............. 56/320.2 |
| 6,050,072 A * | 4/2000 | Chabrier et al. .............. 56/202 |
| 6,089,006 A | 7/2000 | Langford et al. |

FOREIGN PATENT DOCUMENTS

FR 2681216 A1 3/1993

OTHER PUBLICATIONS

The PeCo Lawn Vac System, Approved Allied Equipment For John Deere Outfront Mowers, 2 Pages, 1987.
PeCo Auto Dump Lawn Vac, Model 6113, Equipment Designed For John Deere 700 Series Mowers, 2 Pages, 1991.
Ransomes Bob-Cat GC-FM74S Hydraulic Vac, 2 Pages.

* cited by examiner

*Primary Examiner*—Thomas B. Will
*Assistant Examiner*—Alicia Torres

(57) ABSTRACT

A collection container on a vehicle for lawn, garden, or property care may be connected to the vehicle so as to be movable about an axis that is at least essentially horizontal, whereby the collection container has at least a first position, in which it is arranged essentially above a hood of the vehicle, and can assume a second position, in which the hood may be opened.

4 Claims, 4 Drawing Sheets

COLLECTION CONTAINER FOR A VEHICLE

FIELD OF THE INVENTION

The invention concerns a collection container for a vehicle, especially a vehicle for lawn, garden, or property care, constructed in such a way that it can be connected to the vehicle so as to move about at least one essentially horizontal axis, as well as a vehicle with a collection container of this kind.

BACKGROUND OF THE INVENTION

Vehicles, especially vehicles for lawn, garden, and property care, are often provided with working devices such as mowing machines or sweeping and suction devices that cut and/or collect vegetation. To accept and/or transport the cut matter or the collected material, these vehicles are often provided with collection containers, usually attached to the rear part of the vehicle and attached to the working devices through an ejection channel.

U.S. Pat. No. 6,089,006 shows a collection container of a mowing vehicle with a mowing machine placed on the front side. The collection container is arranged behind the driver's seat and can be emptied backwards, with respect to the mowing vehicle, without blocking access to the motor, which would otherwise be covered by the collection container.

There is a need for a collection container of this kind that can be attached permanently to the vehicle or that cannot be easily detached from it.

SUMMARY OF THE INVENTION

A collection container is provided for a vehicle, especially a vehicle for lawn, garden, and property care, that is suitable for being attached to vehicles that have no collection container or that even have another collection system, such as a collection device that is hooked on or pulled. The collection container is constructed in such a way that it can be attached so as to move about an essentially horizontal axis, and can assume at least a first position in which an operating setting is advantageously involved, essentially above a hood of the vehicle. In addition, the collection container can assume at least another or second position, in which it permits the hood to be opened. A collection container of this kind can be constructed onto a vehicle with a hood that must be opened so that components or parts arranged or protected below it are accessible for service, maintenance, and/or repair work, without the collection container having to be completely detached from the vehicle. The hood also does not have to be removed before or while the collection container is attached in order to make access possible to components or parts arranged below it. In addition, expensive raising mechanisms can be avoided in this way, since the function mentioned above can be accomplished essentially by moving the collection container away.

The collection container can be attached directly to the vehicle or to a vehicle chassis. For this, the collection container should be constructed appropriately, in particular of a suitable material, for example one that is as stiff as possible and that cannot be deformed significantly. The collection container also is equipped with hinges or rods, etc., in order for it to be attached indirectly to the vehicle or the vehicle chassis. Collection containers of this kind are often made of plastic or composite materials, or at least of materials with thin walls and low strength, so that they are as light as possible, and they are frequently implemented with a non-standard geometry, because of fixed construction space or a desired design. In order, nevertheless, to provide a stable connection to the vehicle or the vehicle chassis and/or to make a sufficient attachment area available for the collection container, even when the collection container is full of material, the collection container can have a carrier or be advantageously connected permanently to a carrier that can be attached to the vehicle or vehicle chassis directly or indirectly, for example through hinges, consoles, etc.

If the vehicle to which the collection container is to be attached is equipped with an arch structure, especially of the type for rollover protection, then the collection container or the carrier can be attached to this arch structure. An arch structure or rollover protection structure of this kind is often already configured so that it can be moved away, at least partially, for example, into a lowered position. Such a connection can also be made directly or indirectly by means of additional components, such as consoles, rods, etc.

To bring the collection container to its second position, in which the hood can be opened or in which the collection container releases the hood, it can also be pulled onto the vehicle sideways as well as moved to the front or back. It is especially favorable, especially in regard to the strength of the device, when the movement takes place with respect to the long direction of the vehicle, forward or backward. If, for example, the collection container or the carrier is attached to a rear area of the vehicle, then moving the collection container backward is advantageous, since no support elements are provided and the collection container can be placed on the ground below, for example. If, on the other hand, the collection container or the carrier will be attached to the arch structure or rollover protection structure, then it can be advantageous to move it forward, since this corresponds to the usual direction of movement of such an arch structure and no extensive modifications will have to be made to it. But it can also be possible for the collection container or the carrier to be movable forward or backward.

Collection containers of this kind are used on vehicles, especially on vehicles that are for lawn, garden, and property care. These vehicles can be equipped with a collection container according to the invention during vehicle assembly at the factory. It also is possible to make collection containers of this kind available as component sets to be added later to appropriate vehicles without collection containers or as replacement parts to replace collection containers of the same or different type of construction.

The collection container could also be implemented as a transport container, filled with material either by the vehicle as an independent working device, or manually. However, the vehicle advantageously has a working device that can be moved with or by the vehicle together with the collection container. The working device can be arranged in front of or behind the vehicle or even in side areas, or several different working devices can even be provided in the same areas. The working device or working devices can also be arranged completely outside the vehicle. But in order, for example, to obtain the best possible use of the vehicle dimensions and thus achieve the most compact construction form possible, the working device or at least one of the working devices can be arranged in areas inside the vehicle contour or underneath the vehicle or vehicle chassis and/or between the front and back wheels of the vehicle. The working device can include a mowing machine, for example a sickle or spindle mowing machine, or also a sweeping device or any other kind of working device, but especially a working device that is suitable for accepting or collecting material. The working device can have one or more working parts, for example in the nature of knives, spindles, or brushes.

In order to connect the collection container to the working device, at least one ejection channel can be provided, or the vehicle may be equipped with such a channel. Transportation of the material can take place or be supported by at least one conveyor device, for example in the nature of a blower, or this can be achieved by the action of one or more working units of the working device.

The ejection channel can be arranged depending on the working device. If, for example, the working device is adapted for ejection to the side, then it can be advantageous to arrange the ejection channel in a side area or along a side area of the vehicle. If, however, the working device provides for rear ejection, then the ejection channel can be arranged in the center or middle area of the vehicle, for example at least partly in areas between the back wheels of the vehicle.

The hood can be constructed in one or more parts, and it can be movable, for example, forward or sideways, or even partly forward or sideways. If the hood is attached to the vehicle directly or indirectly so as to move backwards in a rear area of the vehicle, then it can be moved easily, without affecting other components of the vehicle, such as a driver's seat, rollover protection structure, etc.

As already described above, the collection container or the carrier can be connected to the arch structure or rollover protection structure of the vehicle, so that it can move sufficiently for the vehicle to drive through areas of low vegetation, or low gate entrances etc. Such an arch structure is advantageously constructed in such a way that it can be moved forward, and in the forward position it can provide protection for an operator. The arch structure or rollover protection structure can be movable as a unit. But it is also possible to construct it in several parts so that only one part, especially an upper part, is movable, and the structure is secured to the vehicle or vehicle chassis in such a way that only the upper part can move with respect to the vehicle.

The collection container or the arch structure can be attached directly or indirectly in such a way that it moves along with the movable part.

The vehicle can be constructed in a usual manner and have, for example, front and back wheels that can be driven forward and backward and steered, for example, by a steering wheel. Such a vehicle is especially useful when it has at least two wheels that can be driven and steered forward and backward, and at least one front wheel that can move freely or is constructed in such a way that it can swivel. Vehicles of this kind are steered by providing for a difference in speed of the rotation rates of the wheels that are driven, similar to a full-track vehicle, and often have left and right steering controls to affect the speed of each wheel. However, steering by means of a steering wheel or else a joystick is also possible.

The hood of a vehicle, especially for lawn, garden, or property care, is often arranged in a rear area of the vehicle, behind the driver's seat or operator's platform or cabin. This can improve both the usefulness and the maneuverability of the vehicle as well as the driver's view.

A hood of this kind can cover or enclose, for example, a storage space. In particular, however, it covers a machine space or encloses or delimits such a space partially and can be opened or moved for service, repair, or maintenance of components or parts arranged under the hood, such as a motor, a pump, etc.

In order to be able to support or facilitate movement of the collection container, the carrier, or the arch structure, by the operator, or even automate its movement, the vehicle can have support or drive elements that cooperate with the collection container, the carrier, or the arch structure. The support or drive elements can include a gas cylinder, hydraulic cylinder or motor, a spring or a spring device, an electric motor, or any other suitable element. At least one support and drive element can be provided, but such support or drive elements are not required.

DESCRIPTION OF THE PREFERRED EMBODIMENT

Figure 1:
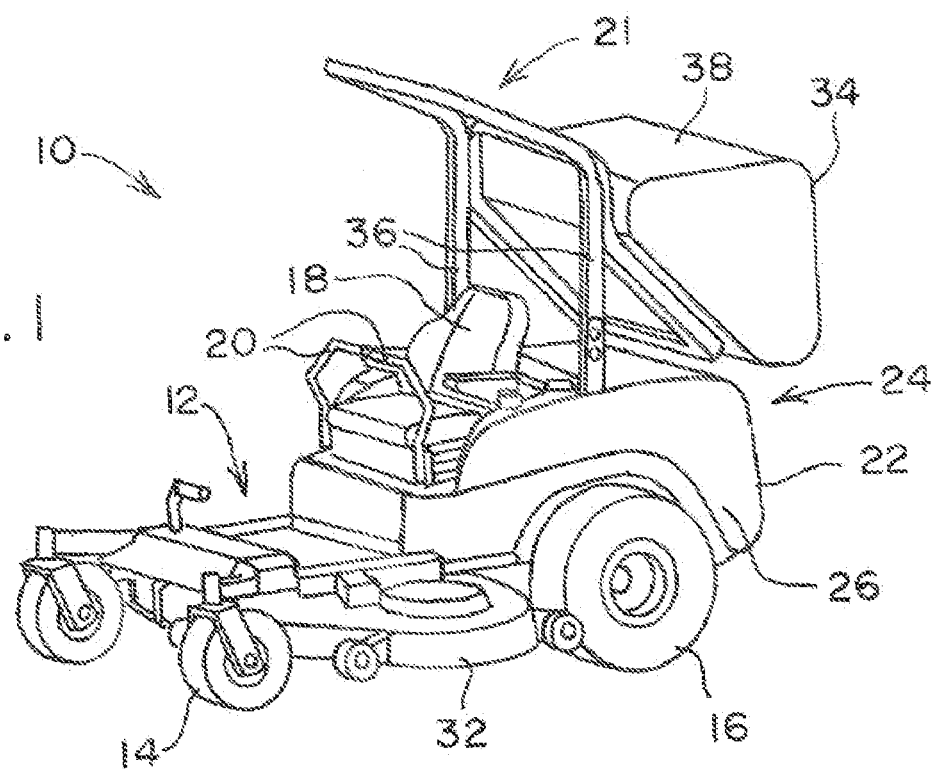
FIG. 1 is a front perspective view showing a vehicle of the mowing-machine type with a collection container attached to an arch structure.

Reference is made first to FIG. 1, which shows a vehicle 10, such as a vehicle for lawn, garden, and property care, with a frame 12, which is supported from the ground by two front, movable wheels 15, and two back, drivable wheels 16.

The vehicle 10 is constructed in such a way that an operator can occupy a driver's seat 18 provided on the vehicle frame 12, in order to operate the vehicle 10 by means of suitable operating elements, of which only two control handles 20 are illustrated, which operate independently of each other. Behind the driver's seat 12, an arch structure 21 is provided that extends essentially vertically, at least during operation, and is constructed in a known manner so that an operator sitting in the driver's seat 18 is protected in case the vehicle 10 rolls over and which is therefore called a rollover protection structure or rollover structure.

Behind the driver's seat 18, a hood 22 is arranged, which is connected to the frame 12 in a rear area 23 of the vehicle 10, so as to move about an essentially horizontal axis 26. According to this embodiment, the hood 22 is connected to the vehicle 10 or the vehicle frame 12 by means of a moving mechanism (not shown).

Below the hood 22 there is a machine space 28, which is covered by the hood 22 in operation and is released by moving the hood 22 backward, for example for service and repair of the components or component groups 30 arranged in the machine space 28 (see FIG. 3).

The components or component groups 30 involve, in a known manner, for example a motor and a drive, especially a hydrostatic drive that connects the motor to the back wheels 14. In addition, the drive makes steering of the vehicle 10 possible, again in a known manner, by means of a steering handle 20, in which the rotation rate and direction of the wheels 14 are determined independently of each other, according to the position of the left and right control handles 20, and the vehicle 10 is steered on the basis of a speed difference of the drive wheels 14, whereby rotation of the vehicle 10 in place is possible, at least in essence. The present invention can, however, also find use in vehicles that are steered in a conventional manner by means of a steering shaft or a steering wheel or by a joystick, etc.

A working device 32 is arranged below the vehicle frame 12 and connected to it, which, according to the present embodiment, is constructed as a sickle mowing machine. The working device can also include any other suitable device, especially for lawn, garden, or property care, but it is, in particular, constructed as a mowing machine, for example a spindle mowing machine, a collection or sweeping device, whereby several working devices or a working device with several working tools, such as knives, spindles, brushes, etc., can also be provided. The working device can be in front of, behind, or at the side of the vehicle 10 or a combination of several similar or different working devices can also be provided.

A collection container 34 is provided in the rear area 24 of the vehicle 10, which is suitable for accepting the material cut or collected by the working device 20. For this, the collection container 34 is connected, for example, to the working device 20 through a suitable channel, which extends advantageously through a central, lower region of the vehicle 10, advantageously below the vehicle frame 12, when the working device 20 is constructed in a known manner for rear ejection. If, instead, a working device 20 with side ejection is involved, the channel extends advantageously along a side area of the vehicle 10.

The collection container 34 can have advantageously a rear flap, not shown, which in turn makes emptying of the collection container possible in a known manner or makes its interior accessible.

According to this first embodiment, the collection container 34 is connected to the arch structure 21, or to a first and a second beam 36 of the arch structure 21, in such a way that it is arranged in its operating mode behind the arch structure 21 in the usual direction of travel of the vehicle 10 and at least essentially above the hood 22. For this, a carrier 38 such as an arched part is also provided, and which is permanently attached to the arch structure 21, for example by screws or welded, so that the container, which is often made of plastic or another relatively easily deformable material, can be supported as uniformly as possible on the carrier 36.

Figure 2:
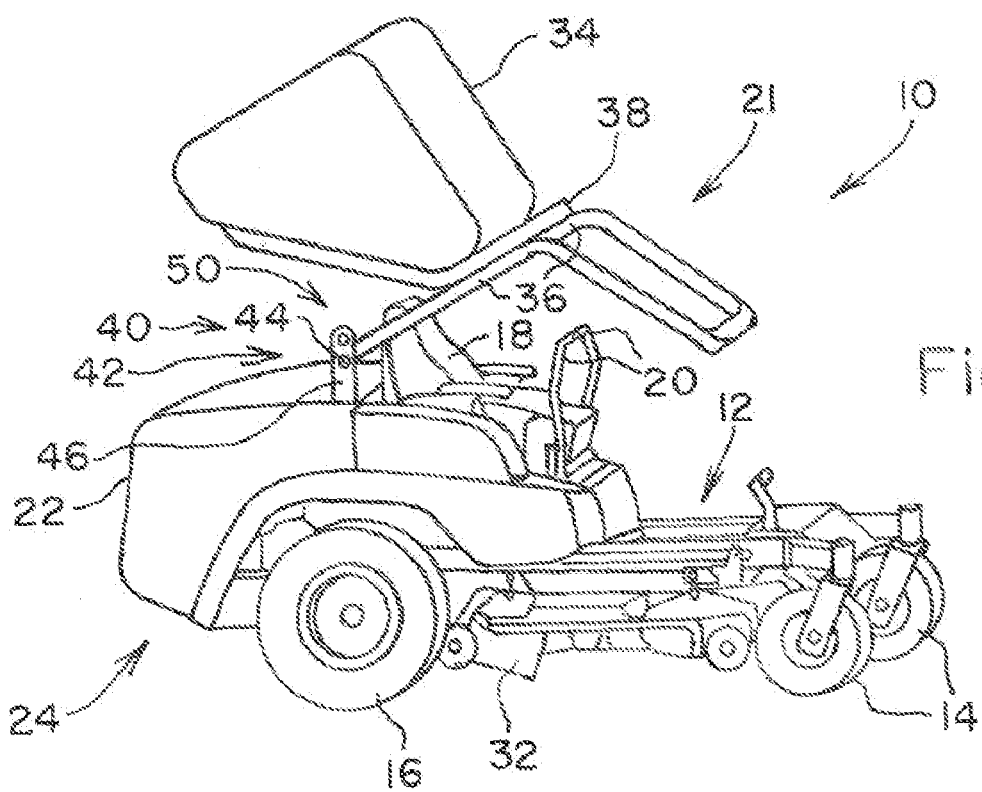
FIG. 2 is a side perspective view of showing the vehicle from FIG. 1, whereby the arch structure has been moved forward together with the collection container.

Reference is now made to FIG. 2, which shows that arch structure 21 is connected to the vehicle 10 or the vehicle frame 12 so as to be movable. For this, the beams 36 in a region 40 facing the vehicle 10 have two parts with one part connected to a pivoting device 42.

The pivoting devices 42 each have a pivot bolt 44 that connects a lower part 46 of the beam 36 permanently attached to the vehicle frame 12 to an upper part 48 of the beam 36, in such a way that the upper part 48 can be moved forward with respect to the usual direction of travel of the vehicle 10.

In order to counteract an unintended movement of the upper part 48, especially during operation of the vehicle 10, at least one of the pivoting devices 42 has a safety device 50, for example in the nature of a setting pin, which extends through the lower part 46 and the upper part 48 during operation and thus secures the upper part 48 with respect to the lower part 46. This setting pin can in turn be held in place by another safety device, for example a spring plug, etc.

In order to move the upper part 48 and thus also the collection container 34 forward, an operator removes the safety device 40 and moves the upper part 48 forward.

Figure 3:
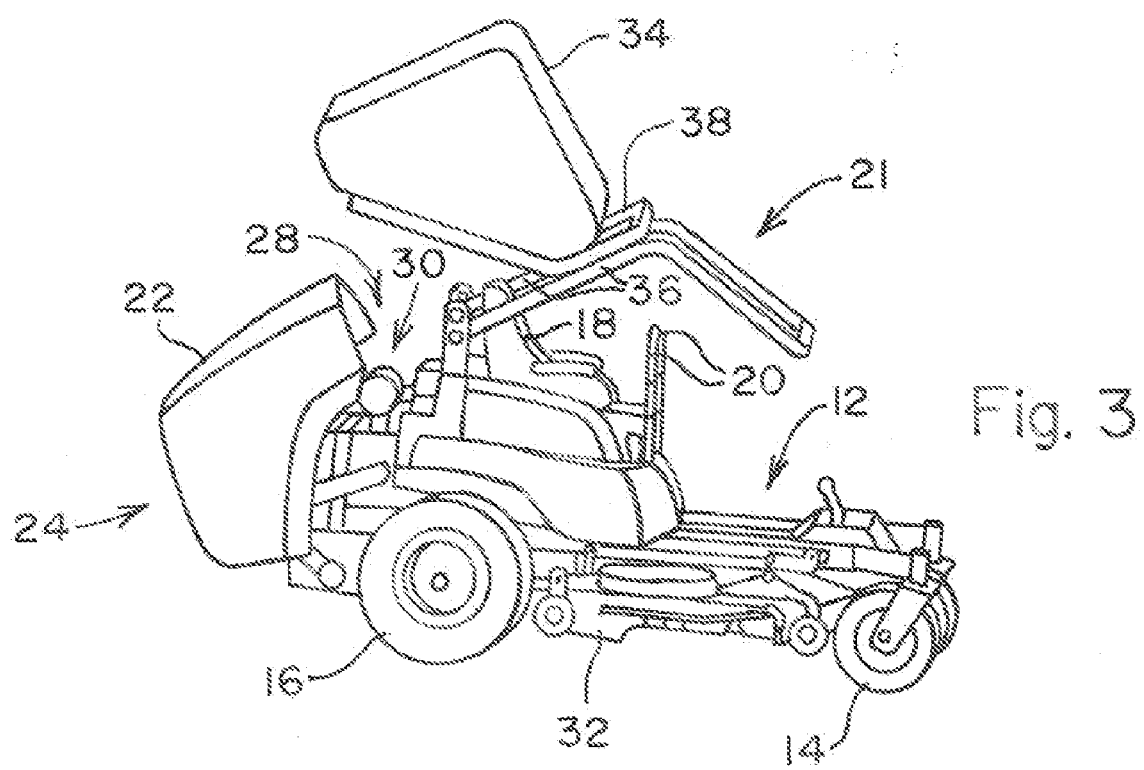
FIG. 3 is a side perspective view of the vehicle in FIG. 2, in which a hood of the vehicle has been moved backward to uncover the components under the hood.

In this way, the hood 22, which is under the collection container 34 during operation, is accessible and can be move backward according to the illustration in FIG. 3, to which reference is made, so that the machine space 28 and the component groups or parts arranged in the machine space 28 are accessible for service or repair purposes, without it being necessary to remove the collection container 34 or the carrier 36 from the vehicle 10 or the arch structure 21.

In addition, collection container 34, in order to simplify emptying, can be moved backward or sideways by means of a separate moving device, not shown. Such a moving device can connect the collection container, for example in a movable manner, to a lower or back area of the carrier 36, so that the collection container can be moved backward or tipped, in order, for example, for cut material to be unloaded onto a place provided for this. The moving device is constructed according to U.S. Pat. No. 6,089,006, cited previously, the disclosure of which is also included in the present application by reference.

Figure 4:
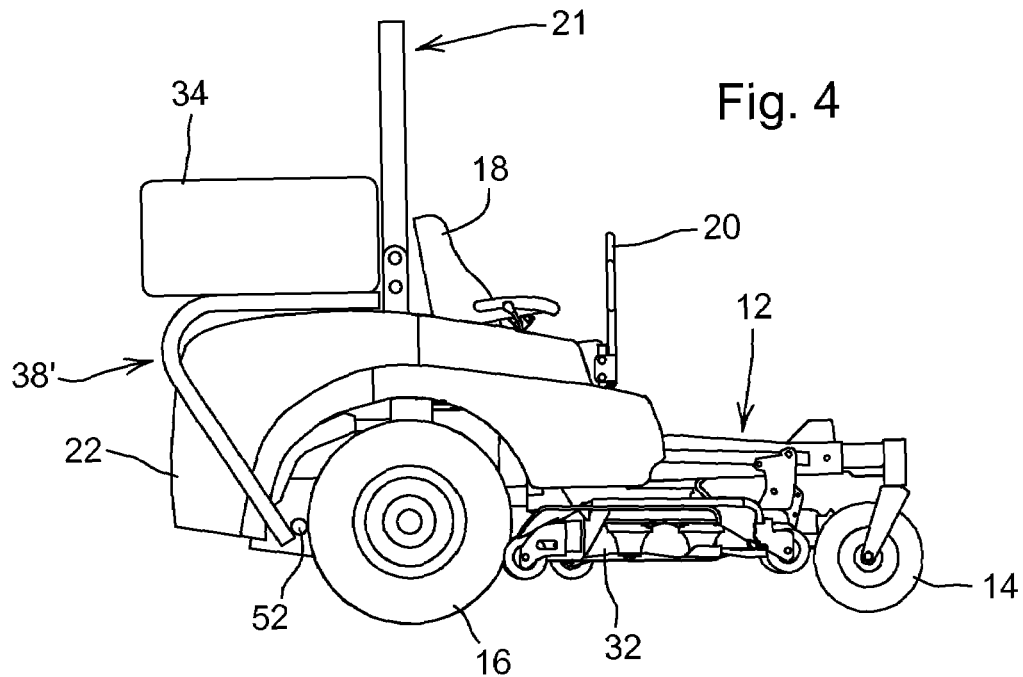
FIG. 4 is a side view of the vehicle from FIG. 1, with a collection container attached to a carrier, whereby the carrier is attached so as to be movable in a rear area of the vehicle.
Figure 5:
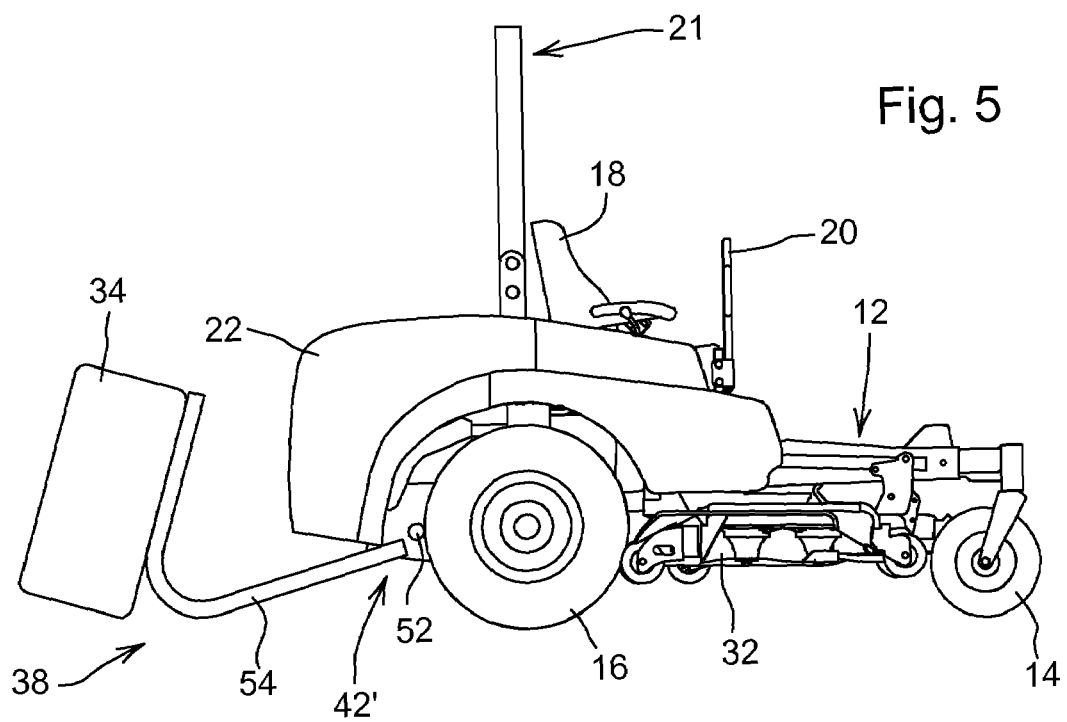
FIG. 5 is a side view of the vehicle from FIG. 4, whereby the carrier has been moved backward with the collection container.

Reference is now made to FIG. 4, which shows a vehicle 10 corresponding to the illustrations in FIGS. 1 through 3 and which is therefore provided with the same reference numbers.

This vehicle 10 also has a collection container 34, which is arranged during operation of the vehicle at least essentially above a hood 22 of the vehicle.

According to this second embodiment, the collection container is not attached to the arch structure 21 of the vehicle. Rather, a carrier 38', independent of the arch structure, is provided, which can be moved backward with the vehicle 10 or the vehicle frame 12 in a rear area 24 of the vehicle 10 by means of a moving device 42' about an axis 52, backward with respect to the usual direction of travel of the vehicle 10. This moving device also has a safety device or safety means, which secures the carrier 38' in a known manner in its position when it has not been moved backward, in which the collection container 34 is arranged above the hood 22, and is to be removed by an operator before the carrier is moved.

The collection container 34 is connected permanently to the carrier 38', which is constructed as an arch that has two beams connected by a cross beam (not shown), in such a way, for example by screws, that it can be moved backward with the carrier by an operator, so that the hood 22 of the vehicle 10 is accessible.

Figure 6:
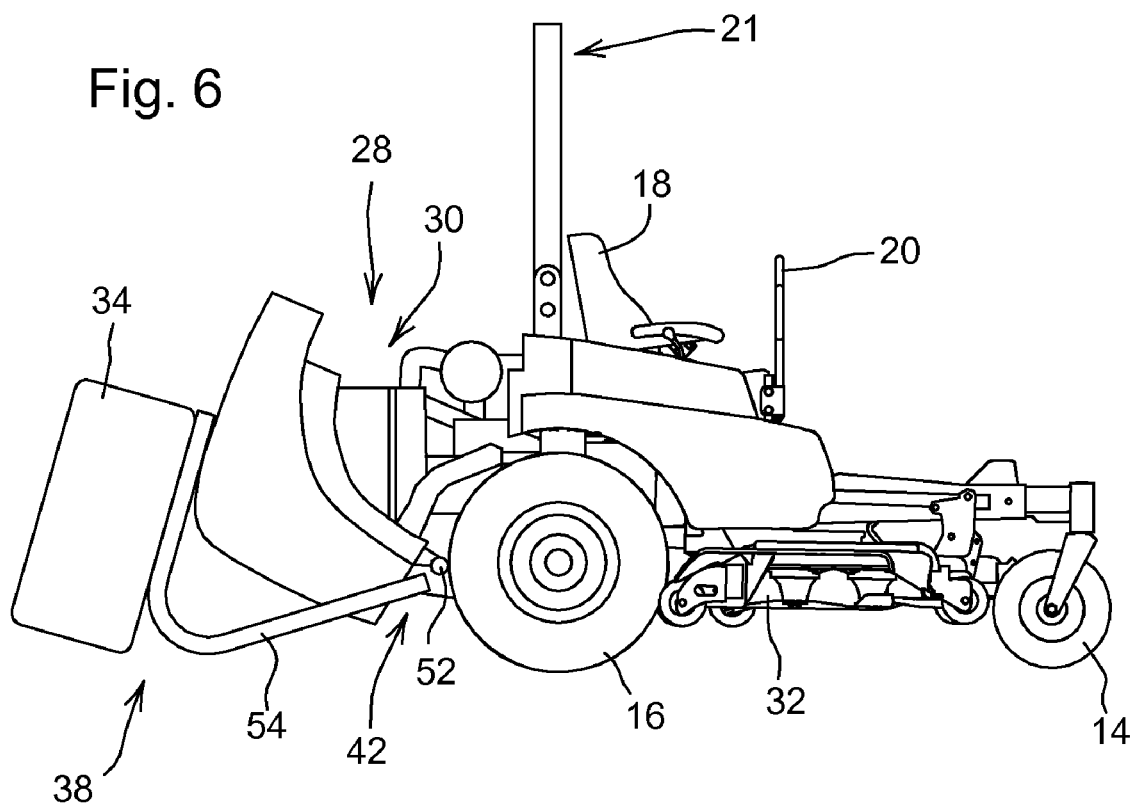
FIG. 6 is a side view of the vehicle from FIG. 5, whereby the hood of the vehicle has been moved backward to uncover components under the hood.

Reference is now made to FIG. 6, which shows that the hood, when the carrier 38' and the collection container 34 have been moved backward according to the first embodiment, can be move backward so that the machine space 28 is accessible.

Having described the preferred embodiment, it will become apparent that various modifications can be made without departing from the scope of the invention as defined in the accompanying claims.

The invention claimed is:

1. A lawn and garden vehicle having front and back wheels, a hood, at least one working device below the vehicle and between the front and back wheels, and a collection container connected to the vehicle so as to be movable about an essentially horizontal axis; the collection container movable to a first position in which it is at least essentially above the hood, and movable forward to a second position in which the hood is openable; wherein the hood is connected to the vehicle in a rear area of the vehicle and is movable backward for opening.

2. The vehicle of claim 1, wherein the working device is a mowing machine.

3. The vehicle of claim 1, wherein the working device is connected to the collection container through at least one ejection channel.

4. The vehicle of claim 1, wherein the working device provides for rear ejection.

* * * * *